United States Patent
Demange et al.

(10) Patent No.: US 12,022,134 B2
(45) Date of Patent: Jun. 25, 2024

(54) ADAPTIVE ON-BOARD MEDIA CHANNEL INTERFACE

(71) Applicant: VIASAT, Inc., Carlsbad, CA (US)

(72) Inventors: Christopher J. Demange, Carlsbad, CA (US); Ronald L. Seager, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 34 days.

(21) Appl. No.: 17/617,515

(22) PCT Filed: Jun. 10, 2019

(86) PCT No.: PCT/US2019/036336
§ 371 (c)(1),
(2) Date: Dec. 8, 2021

(87) PCT Pub. No.: WO2020/251533
PCT Pub. Date: Dec. 17, 2020

(65) Prior Publication Data
US 2022/0256204 A1    Aug. 11, 2022

(51) Int. Cl.
*H04N 21/214* (2011.01)
*H04N 21/258* (2011.01)
*H04N 21/2665* (2011.01)

(52) U.S. Cl.
CPC ... *H04N 21/2146* (2013.01); *H04N 21/25883* (2013.01); *H04N 21/25891* (2013.01); *H04N 21/2665* (2013.01)

(58) Field of Classification Search
CPC ......... H04N 21/2146; H04N 21/25883; H04N 21/25891; H04N 21/2665
See application file for complete search history.

(56) References Cited

U.S. PATENT DOCUMENTS

| | | | |
|---|---|---|---|
| 8,499,324 B1* | 7/2013 | Mitchell | H04L 67/02 709/219 |
| 2014/0298169 A1 | 10/2014 | Williams | |
| 2016/0054905 A1* | 2/2016 | Chai | H04N 21/482 715/719 |
| 2016/0286243 A1 | 9/2016 | Easterling et al. | |
| 2017/0099227 A1* | 4/2017 | Slater | H04L 67/12 |

* cited by examiner

*Primary Examiner* — Nnenna N Ekpo
(74) *Attorney, Agent, or Firm* — HOLZER PATEL DRENNAN

(57) ABSTRACT

Techniques are described for adaptive control of media channel interfaces for delivery of media content over communications systems to transport craft passengers. Embodiments monitor viewership of various media channel offerings provided to transport craft passengers to compute aggregated viewership scores. Based on the scores, respective prominence parameters associated with the various media channel offerings can be automatically updated. Interface control signals can be communicated to cause media channel interfaces being displayed on passenger devices to dynamically and automatically update the graphical listings of the media channel offerings in accordance with the updates to their respective prominence parameters. Dynamically updating the graphical prominence of different media channel offerings can tend to make passengers more likely to view a smaller subset of the media channel offerings, thereby helping to maintain high passenger satisfaction with less network capacity demand.

30 Claims, 7 Drawing Sheets

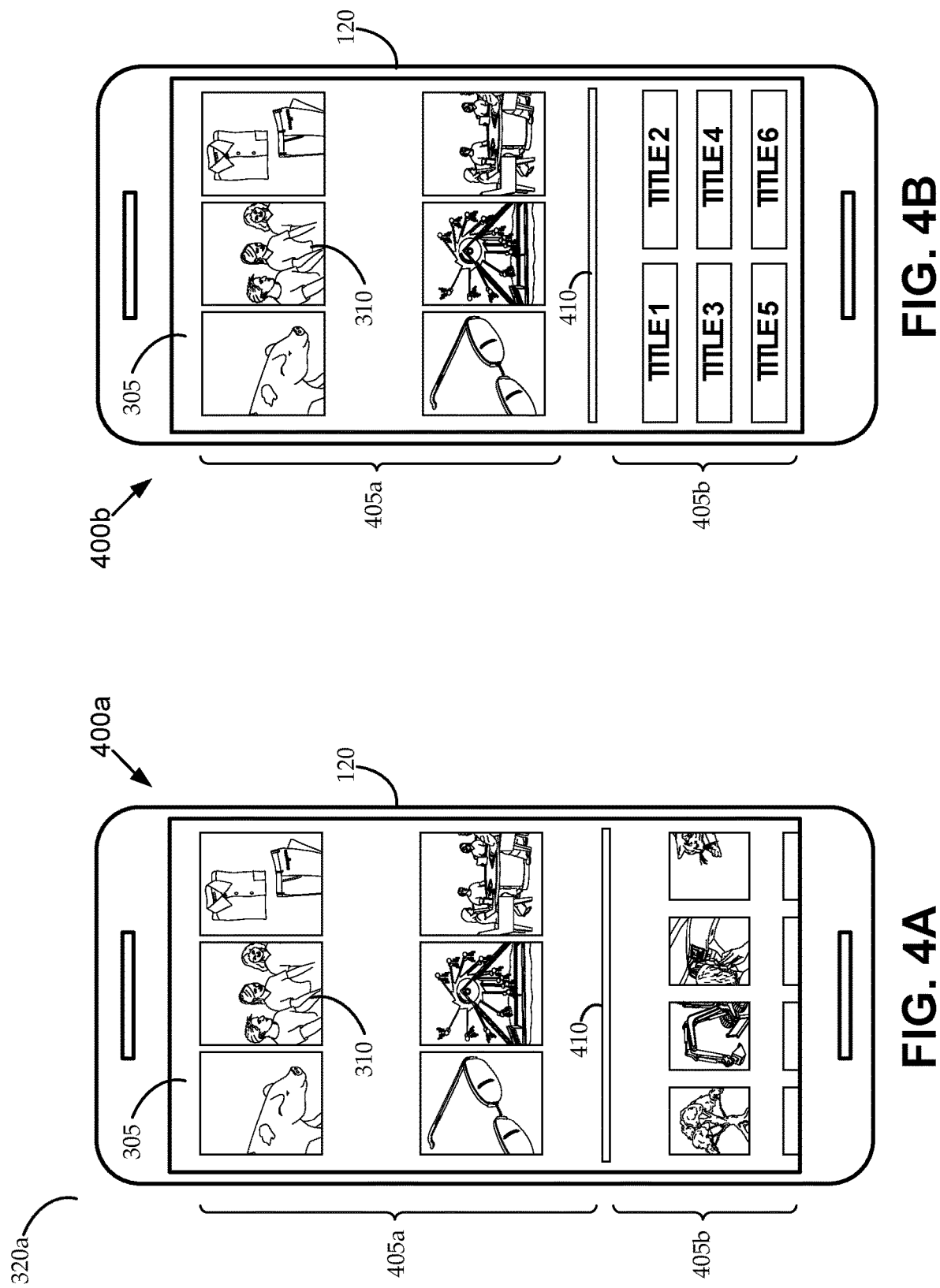

ADAPTIVE ON-BOARD MEDIA CHANNEL INTERFACE

RELATED APPLICATIONS

This application is a U.S. National Stage of PCT Application No. PCT/US2019/036336 filed on Jun. 10, 2019, entitled ADAPTIVE ON-BOARD MEDIA CHANNEL INTERFACE, the entirety of which is incorporated herein by reference.

FIELD

The invention relates generally to communications systems for mobile transport craft. More particularly, embodiments relate to adaptive control of media channel interfaces for delivery of media content over communications systems to transport craft passengers.

BACKGROUND

It is becoming increasingly common for users to desire to consume streaming media while in transit (e.g., on mobile devices, like mobile phones, laptop computers, tablet computers, integrated media terminals, or other in-transport terminals), for example while in airplanes, busses, cruise ships, or other transport craft. Such media consumption can be very data-intensive and can place large burdens on resources of communications networks used to deliver communications services to the transport craft. For example, when many passengers desire to consume streaming media on board an aircraft, there may be insufficient network capacity (e.g., via a satellite network link to the aircraft) to provide all the desired media to all those passengers' devices.

Conventionally, many transport service providers seek to address this concern by storing media content local to (i.e., on-board) the transport craft, and allowing passengers only to access the on-board content. For example, the passengers can consume television programs, movies, and/or other types of media content through wired and/or wireless networks on-board the transport craft, without using any network capacity to stream the media from off-board sources. In some such approaches, passengers can only use off-board network capacity for lower-data applications (e.g., email, text messaging, etc.). In other such approaches, passengers are dis-incentivized from using off-board network capacity, for example, by being charged a fee; or only certain classes of passenger are provided with off-board network access. While such approaches can help minimize the amount of off-board network capacity being used by passengers, such approaches tend to appreciably limit passenger access to off-board media content. As such, conventional approaches often strike a poor balance between minimizing network resource usage and maximizing customer satisfaction.

BRIEF SUMMARY OF THE INVENTION

Embodiments provide techniques for adaptive control of media channel interfaces for delivery of media content over communications systems to transport craft passengers. Typically, passengers can explore which media channel offerings options are available to them via a graphical user interface, such as a media channel interface. Embodiments monitor viewership of the various media channel offerings to compute aggregated viewership scores. Based on the aggregated viewership scores, and detected changes to those scores, respective prominence parameters associated with the various media channel offerings can be automatically updated. Interface control signals can be communicated to cause the media channel interfaces being displayed on passenger devices to update the manner in which the various media channel offerings are graphically presented (e.g., their respective orders, sizes, etc.) in accordance with the updates to their respective prominence parameters.

Dynamically updating the graphical prominence of different media channel offerings can provide various features. Passengers can experience unsatisfactory "choice overload" when offered too many media channel offerings, but passenger experience can similarly be unsatisfactory when offered too few media channel offerings of interest to them. Techniques described herein can adaptively control media channel interfaces, such that desirable media channel offerings are presented to passengers in a more focused manner resulting in a more satisfying in-transit media consumption experience. For example, the adaptively controlled media channel interfaces can encourage selection of media channel offerings likely to be highly relevant due to similarities of interests among passengers, thereby enabling quick and easy channel selection. Thus, such a more focused presentation of desirable media channel offerings can tend to reduce network capacity utilization involved in providing a satisfying in-transit media consumption experience at least by tending to reduce "surfing" among media channel offerings to find a channel of interest, and by tending to reduce the total media channel offerings being streamed to the transport craft at any given time.

According to one set of embodiments, a media delivery and interface (MD/I) system is provided. The system includes a transport craft interface, a media channel viewership controller, and a media channel interface controller. The transport craft interface is disposed in an off-board network of a communications system to communicate with a plurality of client devices disposed on a plurality of transport craft. The media channel viewership controller is disposed in the off-board network and communicatively coupled with the transport craft interface to: receive media viewership signals from the plurality of client devices indicating viewership, by the client devices, of a plurality of media channel offerings that are selectable for viewing via an adaptive on-board media channel interface displayable on each of the client devices; and compute a respective aggregated viewership score for each of the plurality of media channel offerings as a function of aggregating the media viewership signals. The media channel interface controller is disposed in the off-board network and communicatively coupled with the media channel viewership controller and the transport craft interface to: detect a viewership update in response to monitoring for changes in the aggregated viewership scores computed by the media channel viewership controller; update respective prominence parameters associated with each of at least a portion of the plurality of media channel offerings responsive to detecting the viewership update; and communicate interface control signals to the plurality of client devices via the transport craft interface, the interface control signals to directing display, via the client devices disposed on the transport craft, of the adaptive on-board media channel interface to graphically indicate the plurality of media channel offerings in accordance with the respective prominence parameters.

According to another set of embodiments, a method is provided for automatically adapting an on-board media channel interface of a plurality of transport craft in a communications system. The method includes: receiving media viewership signals from a plurality of client devices disposed on a plurality of transport craft indicating viewership, by the client devices, of a plurality of media channel offerings that are selectable for viewing via an adaptive on-board media channel interface displayable on each of the client devices; computing a respective aggregated viewership score for each of the plurality of media channel offerings as a function of aggregating the media viewership signals; detecting a viewership update in response to monitoring for changes in the aggregated viewership scores; updating respective prominence parameters associated with each of at least a portion of the plurality of media channel offerings automatically responsive to detecting the viewership update; and communicating interface control signals to a plurality of on-board media delivery and interface (MD/I) systems responsive to the updating, the interface control signals causing the on-board MD/I systems to direct display, via the client devices disposed on the transport craft, of the adaptive on-board media channel interface that graphically indicates the plurality of media channel offerings in accordance with the respective prominence parameters.

According to another set of embodiments, an on-board media delivery and interface (MD/I) system disposed on a transport craft is provided. The system includes: a provider network interface, an on-board network interface, a media channel request controller. The provider network interface is to communicate with an off-board network of a communications system. The on-board network interface is to communicate, via an on-board communications network, with a plurality of client devices disposed on the transport craft. The media channel request controller is to: communicate with the plurality of client devices via the on-board network interface to direct display of an adaptive on-board media channel interface in accordance with interface control signals received from the off-board network via the provider network interface, the adaptive on-board media channel interface graphically indicating a plurality of media channel offerings in accordance with respective prominence parameters indicated by the interface control signals, the interface control signals generated by the off-board network in accordance with aggregating media viewership signals from at least the transport craft to compute respective aggregated viewership scores for the plurality of media channel offerings, such that the respective prominence parameters for the plurality of media channel offerings are automatically updated to maintain correspondence to the respective aggregated viewership scores for the plurality of media channel offerings; transmit the media viewership signals to the off-board network via the provider network interface, the media viewership signals indicating viewership of the plurality of media channel offerings by the plurality of client devices; and receive the interface control signals from the off-board network via the provider network interface in accordance with the media viewership signals.

According to another set of embodiments, another method is provided for automatically adapting an on-board media channel interface of a transport craft operating in a communications system. The method includes: receiving interface control signals from an off-board network, the interface control signals indicating respective prominence parameters associated with each of a plurality of media channel offerings available for viewing by plurality of client devices disposed on the transport craft; communicating with a plurality of client devices disposed on the transport craft to direct display, via the plurality of client devices, of an adaptive on-board media channel interface in accordance with the interface control signals received from the off-board network, the adaptive on-board media channel interface graphically indicating the plurality of media channel offerings in accordance with the respective prominence parameters; and transmitting media viewership signals indicating viewership of the plurality of media channel offerings by the plurality of client devices, wherein the interface control signals are automatically generated by the off-board network in accordance with aggregating the media viewership signals with viewership data from others of a plurality of transport craft to compute respective aggregated viewership scores for the plurality of media channel offerings, such that the respective prominence parameters for the plurality of media channel offerings automatically update to maintain correspondence to the respective aggregated viewership scores for the plurality of media channel offerings.

BRIEF DESCRIPTION OF THE DRAWINGS

The accompanying drawings, referred to herein and constituting a part hereof, illustrate embodiments of the disclosure. The drawings together with the description serve to explain the principles of the invention.

FIGS. 4A and 4B show illustrative smart phones used as client devices to implement respective examples of media channel interfaces;

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Figure 1:
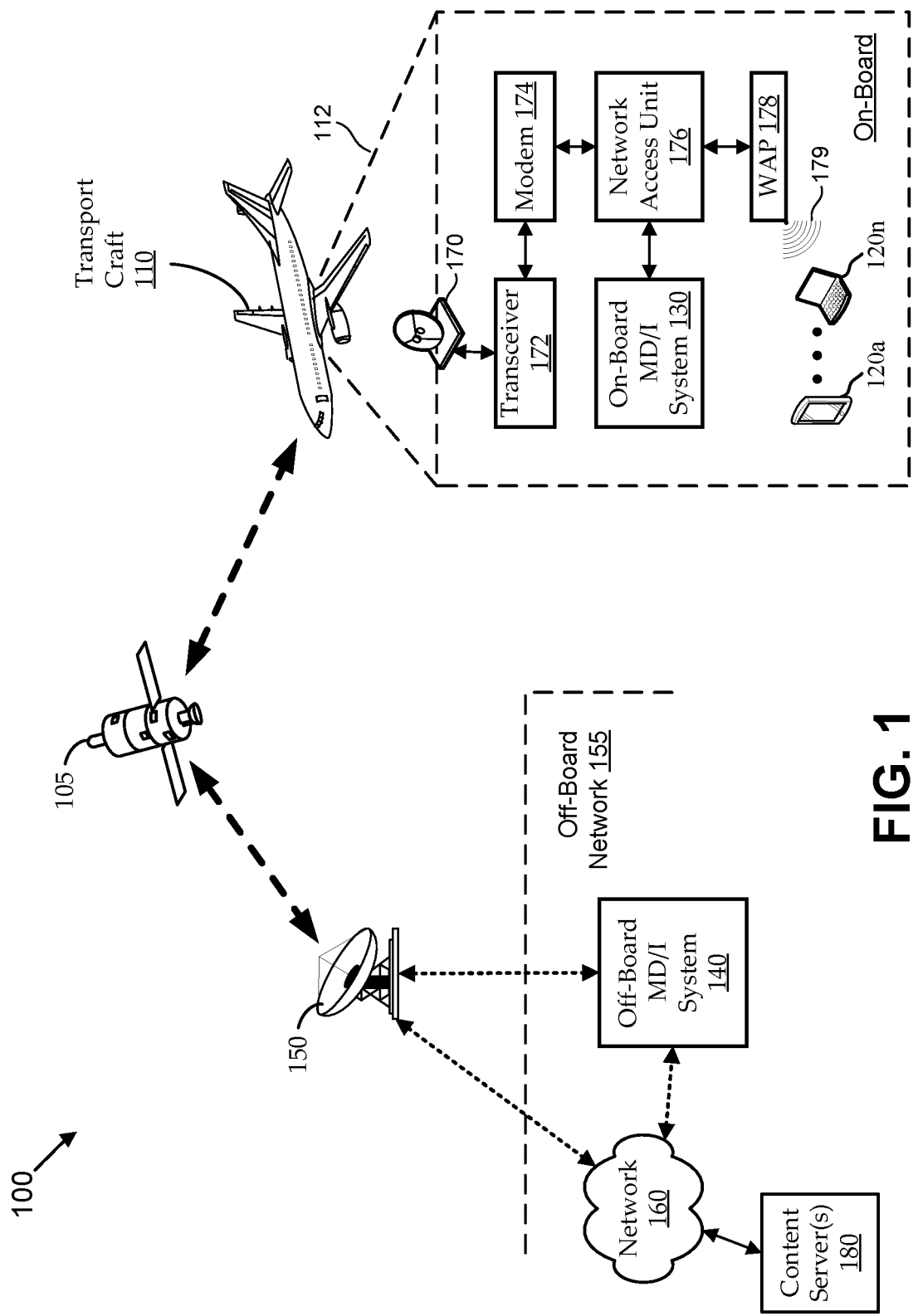
FIG. 1 shows a simplified diagram of a satellite communications system, which provides a context for various embodiments.

FIG. 1 shows a simplified diagram of a satellite communications system 100, which provides a context for various embodiments. Many other configurations are possible having more or fewer components than the satellite communications system 100 of FIG. 1. In the illustrated embodiment, the satellite communications system 100 is being used to provide communications services between an off-board network 155 and one or more transport craft 110. For example, the transport craft(s) 110 can include airplanes, trains, buses, cruise ships, etc.; and any or all such transport craft(s) 110 can communicate via any one or more suitable communications architecture(s) including any suitable communications links, such as satellite communications systems, air-to-ground communication systems, hybrid satellite and air-to-ground communications systems, cellular communications systems, etc. Further, while illustrated as a satellite communications system, embodiments can operate in context of cellular communications systems, and/or any other suitable long-range wireless communications system. For example, as described with reference to FIG. 2 below, portions of the illustrated satellite communications system 100 (e.g., the satellite 105 and the gateway 150) can be one illustrative implementation of one or more intermediary networks that provide connectivity between the off-board network 155 and one or more transport craft 110 (and/or client devices 120 disposed thereon).

Each transport craft 110 can be used to transport one or more passengers, and the satellite communications system 100 can be used to deliver media content to the passengers on board the transport craft 110. Passengers can consume media while on board the transport craft 110 using any suitable type of client device 120. Some client devices 120 can include personal mobile devices, such as smart phones, laptop computers, tablet computers, and the like. Other client devices can include devices installed in the transport craft 110, such as seat-back media displays, shared cabin media displays, and the like. Using the client devices 120, passengers can access a graphical user interface that includes a media channel interface. The media channel interface graphically presents a number of media channel offerings to the passengers. By interacting with the media channel interface (e.g., by interacting with a touchscreen interface, a peripheral input/output device, a remote control, and/or any other user interface associated with a client device 120) a passenger can select any of the media channel offerings for viewing. The media channel offerings can include streamed media channel offerings and pre-positioned media channel offerings. Streamed media channel offerings generally include any media channel offerings being streamed to the transport craft 110, which can provide broadcast television content, on-demand media content (e.g., movies, television episodes, music videos, sports footage, etc.), dedicated media streams, and/or any other suitable content. The term "streamed" is used herein to refer to any suitable manner of communicating a media channel offering to the transport craft 110 via a network external to the transport craft 110 and concurrently with the media channel offering being consumed by one or more passengers, as opposed to the media channel offering being served from storage on-board the transport craft 110. Pre-positioned media channel offerings generally include those served from storage on-board the transport craft 110 (i.e., pre-positioned on the transport craft 110), which can include content segments (e.g., stored movies, television episodes, music videos, sports footage, trailers, advertisements, etc.), and/or any other suitable content.

The streamed media channel offerings can originate from one or more content servers 180. For example, the transport craft 110 can be in communication with an off-board network 155 via a satellite 105 and a gateway 150, and the off-board network 155 can include (or can be in communication with) the content server(s) 180 via one or more content network(s) 160 (e.g., the Internet). The gateway 150 can include, and/or be in communication with, an off-board media delivery and interface (MD/I) system 140. For example, the gateway 150 can be in direct communication with the off-board MD/I system 140, or in communication with the off-board MD/I system 140 via one or more networks (e.g., content network(s) 160). Nodes of the off-board network 155 can be in communication via any suitable types of networks and/or network links, such as the Internet, an IP network, an intranet, a wide area network (WAN), a local area network (LAN), a virtual private network (VPN), a virtual LAN (VLAN), a fiber optic network, a cable network, a public switched telephone network (PSTN), a public switched data network (PSDN), a public land mobile network, and/or any other type of network having wired and/or wireless (e.g., including optical) communications links.

As described herein, features of various embodiments can be enabled by interactions between the off-board MD/I system 140 and an on-board MD/I system 130 disposed on the transport craft 110. Embodiments of the off-board MD/I system 140 and the on-board MD/I system 130 can include any suitable components, such as one or more media servers, media storage devices, etc. Functions and features of the off-board MD/I system 140 and the on-board MD/I system 130 can be implemented in hardware, instructions embodied in memory and formatted to be executed by one or more general or application-specific processors, firmware, or any combination thereof.

The on-board MD/I system 130 can be part of a two-way communication system 112 disposed on the transport craft 110 to facilitate bidirectional communication with the satellite 105. In the illustrated embodiment, the two-way communication system 112 also includes an antenna system 170, transceiver 172, modem 174, network access unit 176, and wireless access point (WAP) 178. The two-way communication system 112 can provide for reception of a forward downlink signal from the satellite 105 and transmission of a return uplink signal to the satellite 105 to support two-way data communications between the client devices 120 within the transport craft 110 and nodes of the off-board network 155 (e.g., the off-board MD/I system 140, the content server(s) 180, etc.). In addition to providing communications between the transport craft 110 and the satellite 105, the two-way communication system 112 can also facilitate communications with the client devices 120. For example, the client devices 120 can communicate with the network access unit 176 via a one or more on-board communication links 179, which can include any suitable wired and/or wireless communications links (e.g., and any other supporting components, such as logical and/or physical ports, etc.). The on-board communication links 179 can be, for example, part of a local area network such as a wireless local area network (WLAN) support by WAP 178. One or more WAPs 178 can be distributed about the transport craft 110, and can, in conjunction with network access unit 176, provide traffic switching and routing functionality; for example, as part of a WLAN extended service set (ESS), etc.

In operation, the network access unit 176 can provide uplink data received from the client devices 120 to the modem 174 to generate modulated uplink data (e.g., a transmit intermediate frequency (IF) signal) for delivery to the transceiver 172. The transceiver 172 can upconvert and amplify the modulated uplink data to generate the return uplink signal for transmission to the satellite 105 via the antenna system 170. Similarly, the transceiver 172 can receive the forward downlink signal from the satellite 105 via the antenna system 170. The transceiver 172 can amplify and downconvert the forward downlink signal to generate modulated downlink data (e.g., a receive IF signal) for demodulation by the modem 174. The demodulated downlink data from the modem 174 can be provided to the network access unit 176 for routing to the client devices 120. The various components of the two-way communication system 112 can be implemented in any suitable manner. For example, while shown as separate components, some or all components can be integrated into a single component (e.g., modem 174 can be integrated with network access unit 176), or segmented into additional components.

As described in more detail below, the on-board MD/I system 130 and/or the off-board MD/I system 140 can provide commands to the network access unit 176 to manage and distribute media channel offerings and to handle related media channel interface commands, with regard to the passengers' client devices 120. For example, it can be desirable to provide a highly satisfying media consumption experience for passengers by offering passengers a large variety of media options (or, at least, a reasonable number of highly relevant options), which can involve making a large variety of media channel offerings available for streaming to the client devices 120 on board the transport craft 110. However, concurrently streaming a large number of media channel offerings to the transport craft can consume an appreciable amount of bandwidth and/or other resources of the satellite communications system 100 (and/or other intermediary networks) servicing the transport craft 110. Accordingly, embodiments seek to maintain a high level of (and even increase) passenger satisfaction with the on-board media consumption experience, while reducing the amount of network capacity being used to provide the on-board media consumption experience. At least to that end, embodiments provide techniques for adaptively and automatically updating the graphical presentation of media channel offerings to passengers via media channel interfaces.

Dynamically updating the graphical prominence of different media channel offerings can provide various features. Passengers can experience unsatisfactory "choice overload" when offered too many media channel offerings, but passenger experience can similarly be unsatisfactory when offered too few media channel offerings of interest to them. Techniques described herein can adaptively control media channel interfaces, such that desirable media channel offerings are presented to passengers in a more focused manner resulting in a more satisfying in-transit media consumption experience. For example, the adaptively controlled media channel interfaces can encourage selection of media channel offerings likely to be highly relevant due to similarities of interests among passengers, thereby enabling quick and easy channel selection. Thus, such a more focused presentation of desirable media channel offerings can tend to reduce network capacity utilization involved in providing a satisfying in-transit media consumption experience at least by tending to reduce "surfing" among media channel offerings to find a channel of interest, and by tending to reduce the total media channel offerings being streamed to the transport craft at any given time.

Figure 2:
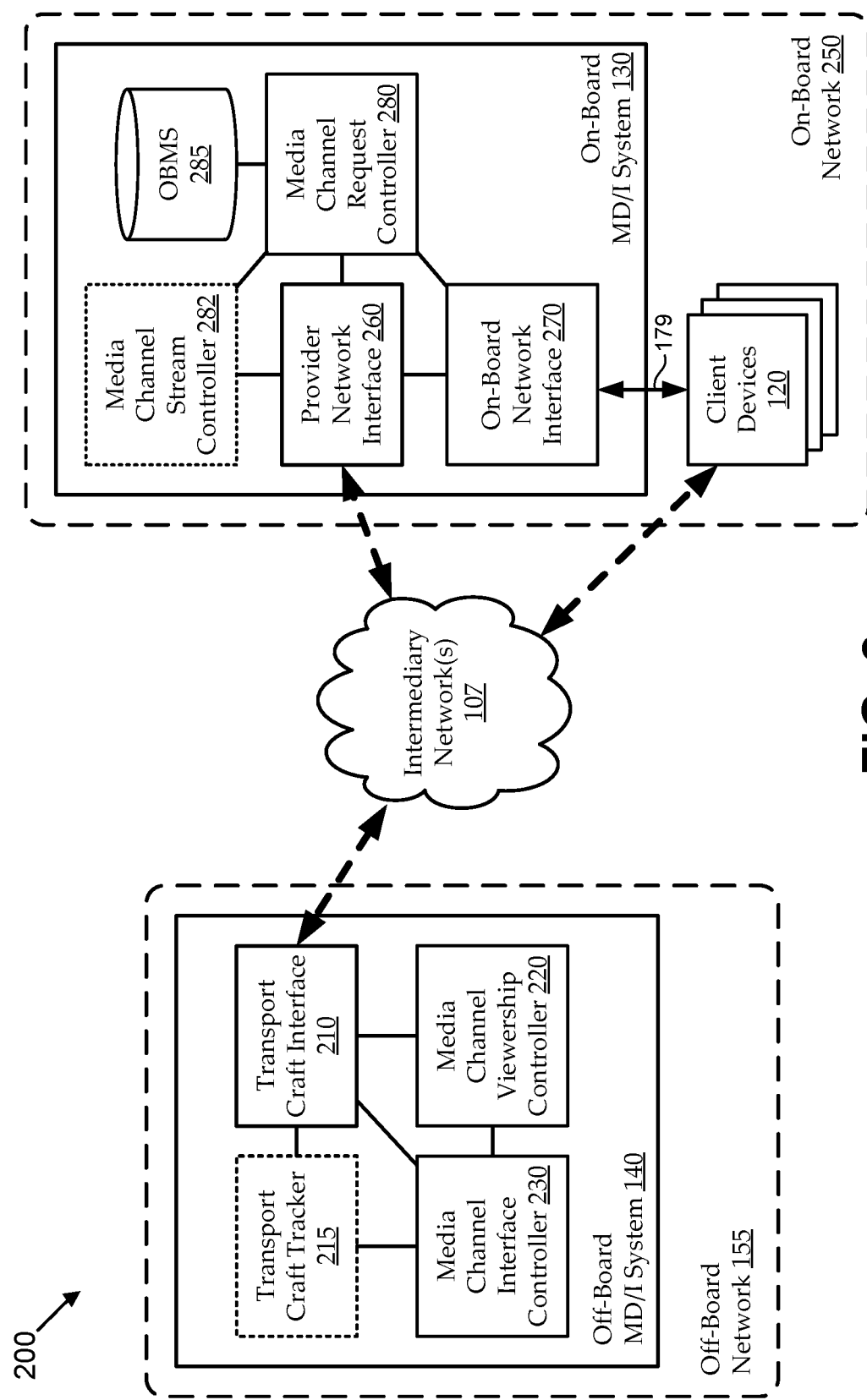
FIG. 2 shows a simplified diagram of a portion of a communications system having an off-board network in communication with on-board networks via one or more intermediary networks, according to various embodiments.

FIG. 2 shows a simplified diagram of a portion of a communications system 200 having an off-board network 155 in communication with on-board networks 250 via one or more intermediary networks 240, according to various embodiments. The communications system 200 can be an implementation of the communications system 100 described with reference to FIG. 1. The one or more intermediary networks 240 can include any suitable communications links and architectures, such as any suitable wired and/or wireless links, public and/or private networks, etc. Typically, because of the mobile nature of the transport craft 110, the one or more intermediary networks 240 will likely involve at least one long-range wireless communications link. The at least one long-range wireless communications link can include one or more satellite communications links (e.g., as shown in FIG. 1), one or more cellular communications links, and/or any other suitable wireless communications link(s). Such wireless links can be generally referred to as "carriers," which can operate in any suitable one or more frequencies, phases, polarizations, etc.; which may or may not overlap. In one implementation, the one or more intermediary networks 240 include a multi-carrier satellite communications network that serves a large service area made up of multiple spot beam coverage areas. In such a multi-carrier communications network, as the transport craft 110 moves through the communications network, it can move through multiple carrier coverage areas; so that communications services can be provided to the transport craft 110 (and/or to client devices 120 on board the transport craft 110) via different carriers over time. For example, during a transatlantic or international airplane flight, the airplane, and the client devices 120 of passengers on the airplane, may move through a number of carrier coverage areas, and the different carriers servicing those coverage areas can be used over time to maintain communications with the transport craft 110 over a large geographic region covered during transport (e.g., the traversed region is larger than a single carrier coverage area), and/or to provide other features, such as facilitating load balancing across multiple carriers, grouping of terminals by carrier, etc.

Each on-board network 250 is disposed in a transport craft 110 (e.g., as shown in FIG. 1), and a single transport craft 110 can have more than one on-board network 250 disposed thereon. Each on-board network 250 can include at least one on-board MD/I system 130 by which to provide media services (e.g., and other communications services in some cases) to some or all of the client devices 120 of passengers on board the transport craft 110. Some implementations of the on-board network 250 facilitate connectivity between the client devices 120 and the intermediary network(s) 240 via components of the on-board MD/I system 130 via one or more on-board communication links 179 (e.g., wired and/or wireless links). Additionally or alternatively, some implementations of the on-board network 250 facilitate connectivity between the client devices 120 and the intermediary network(s) 240 without passing through components of the on-board MD/I system 130 (e.g., the client devices 120 are in communication with the intermediary network(s) 240 via the WAP 178, network access unit 176, modem 174, transceiver 172, and antenna system 170 of FIG. 1). Accordingly, for the sake of simplicity, the client devices 120 and the on-board MD/I system 130 are both shown as part of the on-board network 250.

The off-board network 155 can include any suitable components disposed in any suitable location or locations; such that the off-board network 155 is remote from the transport craft 110, but able to be in communication with the on-board networks 250 of the transport craft 110. The off-board network 155 can include at least one off-board MD/I system 140 by which to provide media services (e.g., and other communications services in some cases) to some or all of the transport craft 110. Though not shown, embodiments of the off-board network 155 can include, and/or be in communication with, one or more content servers 180 (e.g., via one or more content networks 160). As described with reference to FIG. 1, some implementations of the off-board network 155 facilitate connectivity between the content servers 180 and the intermediary network(s) 240 via components of the off-board MD/I system 140. Additionally or alternatively, some implementations of the off-board network 155 facilitate connectivity between the content servers 180 and the intermediary network(s) 240 without passing through components of the off-board MD/I system 140 (e.g., some or all of the content servers 180 are in communication with the intermediary network(s) 240 via the content networks 160 of FIG. 1).

As noted above, features of various embodiments can be enabled by interactions between the off-board MD/I system 140 and the on-board MD/I systems 130 disposed on the transport craft 110. The off-board MD/I system 140 can include a transport craft interface 210, a media channel viewership controller 220, and a media channel interface controller 230. Embodiments of the transport craft interface 210 can facilitate communications between the off-board MD/I system 140 and the intermediary networks 240, thereby also facilitating communications between the off-board MD/I system 140 and client devices 120 on board the transport craft 110. The transport craft interface 210 can include any suitable components for communicatively interfacing with the intermediary networks 240, such as one or more antennas, transceivers, amplifiers, filters, switches, routers, wired and/or wireless ports, components to implement one or more communications protocols, etc.

Embodiments of the media channel viewership controller 220 can be communicatively coupled with the transport craft interface 210 to receive media viewership signals from the client devices 120. The media viewership signals can be received from the client devices 120 and/or from the on-board MD/I system 130. The media viewership signals can indicate viewership, by the client devices 120, of the multiple media channel offerings that are selectable for viewing via adaptive on-board media channel interfaces displayable on each of the client devices 120. For example, when a passenger desires to view media while on board the transport craft 110, the passenger can use a client device 120 (e.g., a personal device, such as a smart phone, laptop computer, tablet computer, etc.; or a provided device, such as a seat-back media display) to access one or more media channel interfaces. The media channel interfaces can graphically display a listing of available media channel offerings that can be selected by the passenger via the interface (e.g., by interacting with a touchscreen interface). In one implementation, the media channel interface includes an array of icons, each representing a selectable media channel offering. In another implementation, the media channel interface includes a grid-type listing of available media channel offerings (e.g., similar to an electronic program guide). In another implementation, the media channel interface includes a text-only listing of available media channel offerings. In some implementations, the media channel interface can include additional navigation features, such as interface controls (e.g., virtual touchscreen buttons) for sorting displayed media channel offerings, filtering displayed media channel offerings, categorizing media channel offerings (e.g., using tabs, sub-menus, etc.), etc.

Figures 3A, 3B:
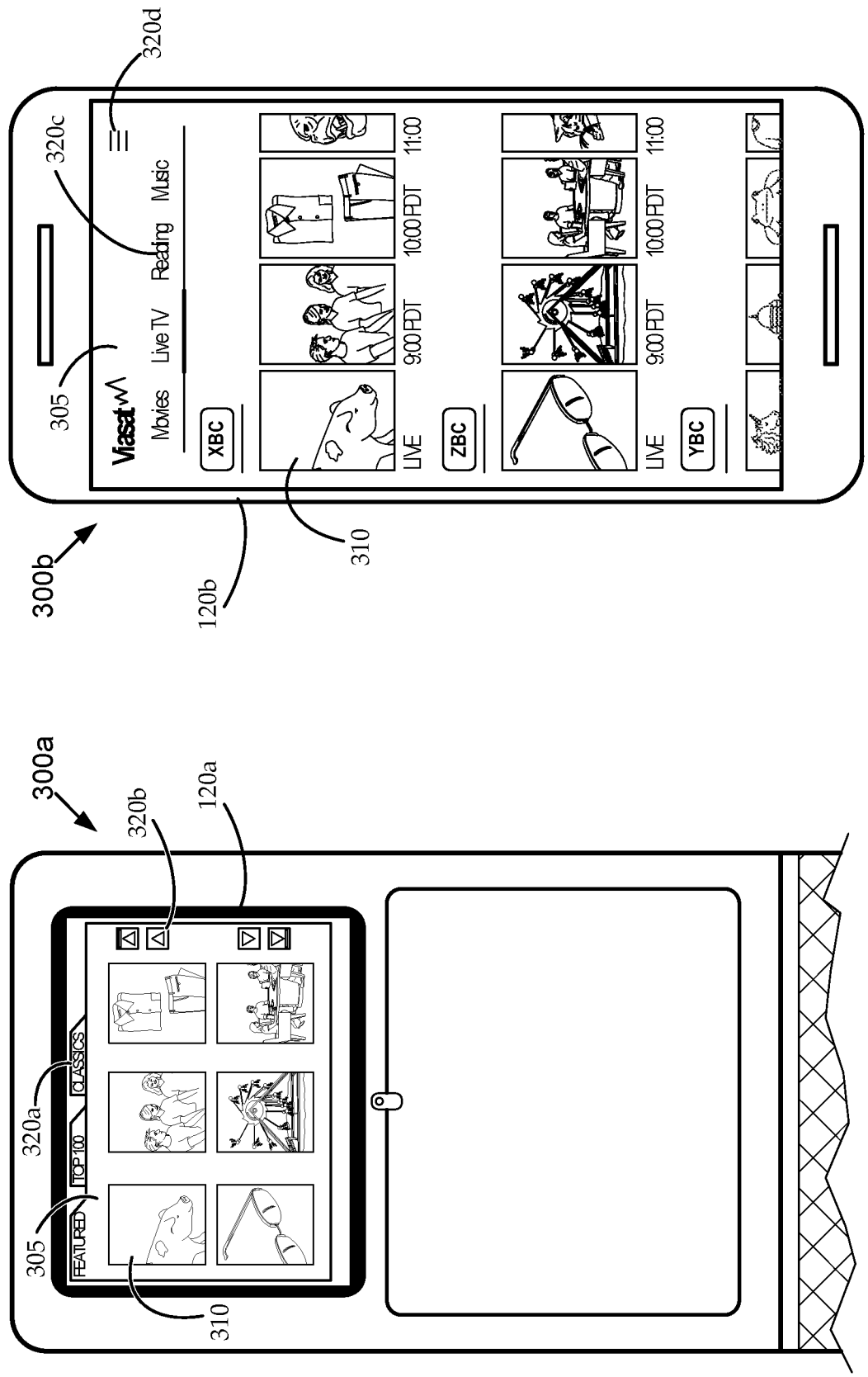
FIGS. 3A and 3B show two example implementation contexts for client devices, according to various embodiments.

For the sake of illustration, FIGS. 3A and 3B show two example implementation contexts 300 for client devices 120, according to various embodiments. FIG. 3A shows a first client device 120*a* implemented in a seat back context 300*a*, the client device 120 being an interactive seat-back display (e.g., integrated in the back of a passenger seat of an aircraft, bus, train, or other transport craft 110). FIG. 3B shows a second client device 120*b* implemented in a personal mobile electronic device context 300*b*, the client device 120 being a smart phone. In each context 300, the client device 120 provides a respective media channel interface 305 via which a passenger can select one of multiple offering interface controls 310 representing corresponding media channel offerings.

Further, each media channel interface 305 can include one or more navigation interface controls 320 to facilitate navigation among features of the media channel interface 305 by the passenger. For example, FIG. 3A shows a first type of navigation interface control 320*a* that allows the passenger to switch between multiple tabs. In the illustrated implementation, a subset of media channel offerings having the highest prominence parameters is presented on a "Featured" tab, or the like, and the "Featured" tab is the default tab presented to passengers (e.g., when they first start using the interface. FIG. 3A also shows a second type of navigation interface control 320*b* that allows the passenger to scroll up and/or down in the interface (e.g., line by line, page by page, etc.). For example, selecting any media channel offering that does not have high prominence parameters can involve a relatively high number of interactions with the media channel interface 305; such as involving one or more additional "clicks" (or other suitable interactions with navigation interface controls 320) to get to another tab, to scroll to another page, etc. As such, passengers can be more likely to select the media channel offerings with the highest prominence parameters.

The media channel interface 305 of FIG. 3B can include the same and/or different offering interface controls 310 and/or navigation interface controls 320. For example, FIG. 3B shows a third type of navigation interface control 320*c* that allows the passenger to switch between content types, such as between movies, live television, audiobooks, music stations, etc. As described herein, certain of the presented media channel offerings can be received substantially in real-time as content streams (streamed media channel offerings), while others of the presented media channel offerings can be pre-stored in storage on board the transport craft 110 and received therefrom (pre-positioned media channel offerings). In one implementation, the on-board storage includes a number of pre-positioned audiobooks, music channels, short form video content, movies, and television episodes; and streaming media channel offerings can include additional movies, and one or more live (e.g., linearly programmed, broadcast, etc.) television channels. FIG. 3B also shows a fourth type of navigation interface control 320 (e.g., illustrated as a so-called "hamburger" menu control) that provides the passenger with additional menu and/or navigation options.

The implementation contexts 300 and media channel interfaces 305 shown in FIGS. 3A and 3B are intended only to illustrate certain implementations, and are not intended to limit other potential implementations. Other embodiments can be implemented in other contexts, such as by a laptop computer, a tablet computer, a wearable device, a shared display in a transport craft 110 (e.g., a display shared among two or more seats of the transport craft 110), etc. Further, while the illustrated media channel interface 305 are shown as touchscreen interfaces, any suitable user interfaces can be supported. For example, the seat-back context of FIG. 3A can be implemented with physical buttons integrated into the seatback display; implemented with a remote control integrated into the seatback, integrated in an armrest, or the like;

and/or in any other suitable manner. Further, while the offering interface controls 310 are shown as arrays of icons displayed on the media channel interfaces 305, other implementations can display the offering interface controls 310 in any other suitable manner, such as using a single row or column, using text instead of or in addition to icons, etc. Further, any suitable offering interface controls 310, navigation interface controls 320, and/or other controls can be included in the media channel interface 305 to support features described herein.

Regardless of what type of media channel interfaces are provided at the client devices 120, the graphical representation of each of the various media channel offerings can be in accordance with a respective prominence parameter assigned to, or otherwise associated with, the media channel offering. The prominence parameter can indicate prominence of a respective media channel offering in any suitable manner. In some implementations, the prominence parameters are represented as relative scores (e.g., an integer value between one and five). In other implementations, the prominence parameters are represented as a tag (e.g., "high," "medium," or "low"). Further, the prominence parameters can be associated with the media channel offerings in any suitable manner. In some implementations, each prominence parameter is represented in the metadata of its associated media channel offering. In other implementations, each prominence parameter is stored in a database in relation to an indicator of its associated media channel offering (e.g., in a relational database).

The media channel interface can graphically differentiate based on prominence parameters in any suitable manner. In some implementations, the order in which media channel offerings are displayed on the media channel interface media channel interface accords with the respective prominence parameters. For example, media channel offerings with higher prominence parameters are listed first in the media channel interface (e.g., higher up on the screen). In other implementations, adapting the order to accord with respective prominence parameters can involve exploiting other graphical and/or navigation elements of the media channel interface. In one such implementation, the media channel interface includes multiple such section dividers by which to graphically categorize media channel offerings by prominence. In another such implementation, the media channel interface can graphically categorize media channel offerings by prominence using different tabs, menus, sub-menus, preset categories or filters, and or other interactive features. For example, the highest prominence media channel offerings can be displayed on a main page of a media channel interface, while other media channel offerings are accessible only by navigating away from the main page (e.g., as in FIG. 3A).

In another such implementation, the media channel interface includes a line, box, or other section divider; and media channel offerings with higher prominence can be displayed "above the fold" (e.g., above a dividing line, inside a dividing box, etc.). FIGS. 4A and 4B show illustrative smart phones 400 used as client devices 120 to implement respective examples of media channel interfaces 305. Each media channel interface 305 includes a graphical divider 410, which creates a graphical perception of a primary region 405a of the media channel interface 305 (e.g., above the fold), and a secondary region 405b of the media channel interface 305 (below the fold). For example, the highest prominence media channel offerings can be presented in the primary region 405a, and the lower prominence media channel offerings can be presented in the secondary region 405b. Any suitable graphical divider 410 can be used, for example to subtly focus the passenger's attention on a desired subset of the media channel offerings displayed on the media channel interface 305. Additional techniques can also be used to further visually segregate the regions 405. For example, in FIG. 4A, the offering interface controls 310 are all implemented as graphical icons, but the graphical icons of the primary region 405a are larger than those of the secondary region 405b. In FIG. 4B, the offering interface controls 310 of the primary region 405a are implemented as graphical icons, while the offering interface controls 310 of the secondary region 405b are implemented as text (e.g., titles).

Returning to FIG. 2, in other implementations, the relative display size for each media channel offering accords with the respective prominence parameters. For example, media channel offerings with higher prominence parameters are indicated on the media channel interface using larger icons and/or larger fonts. In other implementations, the coloration of each media channel offering accords with the respective prominence parameters. For example, media channel offerings with higher prominence parameters are displayed with a particular background color, color palette, font color, highlighting, etc. that provides a more prominent appearance in the media channel interface. In other implementations, the framing of each media channel offering accords with the respective prominence parameters. For example, media channel offerings with higher prominence parameters are graphically framed (e.g., with a colored border, with a particular amount of white space, etc.) in a manner that provides a more prominent appearance in the media channel interface. In other implementations, each media channel offering is displayed with certain animations that accord with the respective prominence parameters. In one such implementation, the fonts and/or icons used to indicate media channel offerings with high prominence can be animated (e.g., by continually changing color, size, and/or shape) to draw a viewer's attention. In another such implementation, media channel offerings with high prominence can be displayed with a running preview (e.g., a movie or program trailer, a glimpse into what is presently paying on a media channel, etc.). In different implementations (e.g., depending on the type of media channel interface, the type of input/output capabilities of the client device 120, etc.), the running preview can be continuous (e.g., the running preview is, or is part of, the indication of the media channel offering, or responsive to interaction (e.g., the running preview plays in response to a mouse-over event, or a comparable touchscreen event).

Some embodiments of the media channel interface can be adapted to graphically represent media channel offerings, including both streamed media channel offerings and pre-positioned media channel offerings (i.e., those that are streamed to the client devices 120 via the intermediary networks 240 and those that are pre-positioned on the transport craft 110 and locally served to the client devices 120, respectively). As described above, in some embodiments, all the media channel offerings are streamed to the client devices 120 on board the transport craft 110 from one or more content servers 180. In other embodiments, some of the media channel offerings are pre-positioned on the transport craft 110 (e.g., on an on-board media store 285, as described below). The pre-positioned media channel offerings can include movies, television series episodes, short-form video content, audio content, interactive (e.g., video game) content, and/or any other suitable content that may be comparable to and/or different from the streamed media channel offerings. Locally serving client devices 120 with pre-positioned media channel offerings can enable passengers to view those of the media channel offerings without using network resources of intermediary networks 240.

In embodiments that provide pre-positioned media channel offerings via the media channel interface, the pre-positioned media channel offerings can be represented in any suitable manner. In some implementations, the pre-positioned media channel offerings are provided on a separate menu, sub-menu, tab, and/or other separated portion of the media channel interface. In other implementations, the pre-positioned media channel offerings are graphically indicated in the media channel interface along with the streamed media channel offerings. In certain such implementations, prominence parameters can be computed (or otherwise determined) for some or all of the pre-positioned media channel offerings, thereby impacting the. In other such implementations, groups of streamed and pre-positioned media channel offerings can be positioned relative to each other, and media channel offerings within each group may or may not be impacted by prominence parameters. In one such implementation, the media channel interface shows a high-prominence group, followed by a mid-prominence group, followed by a low-prominence group. The high-prominence group can be a set of (e.g., ten) streamed media channel offerings, ordered in accordance with their prominence parameters; the mid-prominence group can be a set of (e.g., thirty) pre-positioned media channel offerings; and the low-prominence group can be a set of (e.g., fifty) streamed media channel offerings identified as having lower prominence parameters. The number of channel offerings within each group can vary from embodiment to embodiment. The manner in which the pre-positioned media channel offerings are ordered within the mid-prominence group can vary from embodiment to embodiment. In one embodiment, the pre-positioned media channel offerings are selected and ordered within the mid-prominence group in accordance with determined similarities to at least some of the high-prominence group of streamed media channel offerings.

As described herein, adapting the media channel interface to make certain subsets of media channel offerings more graphically prominent can tend to increase the probability that a passenger will select those media channel offerings for viewing. Further, embodiments seek to determine which of the media channel offerings appear to be most popular and to associate those more popular media channel offerings with prominence parameters that result in more prominent graphical representation, which can further increase the likelihood that passengers will select those media channel offerings, and also increase the likelihood that those passengers will be satisfied with their selections. Thus, even though a large number of media channel offerings is available, passengers will likely select a relatively small subset of those media channel offerings that have either already being selected by one or more other passengers, or are likely to be subsequently selected by one or more passengers. As such, more passengers' demand for on-board media consumption can be satisfied with fewer media channel offerings being communicated to the transport craft 110, thereby maintaining a high level of passenger satisfaction with a reduced usage of overall network capacity (e.g., particularly over large numbers of client devices 120 and large numbers of transport craft 110).

Various techniques are described for adapting the media channel interface to graphically represent different media channel offerings in accordance with their respective prominence parameters. In some embodiments, a large number of streamed media channel offerings is available from the off-board network 155, and all those streamed media channel offerings are accessible to each passenger via the passenger's media channel interface. As described herein, various implementations of such embodiments can use various techniques to graphically prioritize such large numbers of options, such that higher prominence media channel offerings are more graphically prominent in the media channel interface, while lower prominence media channel offerings are less graphically prominent in the media channel interface. In other embodiments, though a large number of streamed media channel offerings is available from the off-board network 155, only a subset of those streamed media channel offerings is made accessible to each passenger via the passenger's media channel interface in accordance with the respective prominence parameters of those offerings. For example, fifty streamed media channel offerings are available via the off-board network 155 (e.g., from one or more content servers 180, as shown in FIG. 1), but only the top fifteen streamed media channel offerings (with respect to prominence parameters) are provided to the transport craft 110 for selection via the media channel interface.

Various components of the off-board MD/I system 140 can seek to dynamically determine and update appropriate assignments of prominence parameters for the media channel offerings, and to direct dynamic updates to the generation of media channel interfaces, accordingly. In some implementations, the media viewership signals received by the media channel viewership controller 220 indicate which of the media channel offerings have been watched, and/or are presently being watched, by client devices 120, in accordance with viewing selections made through the media channel interfaces. In other implementations, the media viewership signals include additional information, such as when different media channel offerings were viewed (e.g., timestamps), durations of views (e.g., whether the entire media channel offering was viewed, or only a portion), numbers of views (e.g., over a time window), locations of views (e.g., where geographically the viewing took place, on board which transport craft 110 the viewing took place, during which transport route the viewing took place, etc.), and/or any other suitable information.

Using the media viewership signals, embodiments of the media channel viewership controller 220 can compute a respective aggregated viewership score for each of the media channel offerings as a function of aggregating the media viewership signals. In some implementations, the media channel viewership controller 220 can determine, for each transport craft 110, a respective set of client devices 120 as being disposed on the transport craft 110. In such implementations, the media channel viewership controller 220 can aggregate the media viewership signals at least per transport craft 110 in accordance with aggregating, for each transport craft 110, the media viewership signals corresponding to the respective set of client devices 120 for the transport craft 110. For example, at any particular time, there may be thousands of client devices 120 consuming media across hundreds of transport craft 110 over the entire communications network (e.g., over all the links of the intermediary network(s) 240); but only a particular subset (e.g., tens of the client devices 120) are on board any particular one of the transport craft 110, and the media viewership signals corresponding to that particular subset is used compute aggregated viewership scores for that transport craft 110. In some such implementations, the aggregation is both by media channel offering and by transport craft 110. For example, a respective aggregated viewership score is computed for each of the media channel offerings for each transport craft 110.

In other implementations, the media channel viewership controller 220 is to compute the respective aggregated viewership score for each of the media channel offerings by aggregating the media viewership signals across those of the plurality of transport craft serviced by each of multiple carriers, where the intermediary network(s) 240 include a multi-carrier communications system. For example, in a satellite communications system, as any given time, different transport craft 110 may be serviced by different carriers (e.g., spot beams), and the respective aggregated viewership scores can be computed for each carrier. In other implementations, the media channel viewership controller 220 is to compute the respective aggregated viewership score for each of the media channel offerings by aggregating the media viewership signals across a subset of communication links of the intermediary network(s) 240 that are determined to experience congestion exceeding a predetermined congestion threshold during at least some time period of interest. In other implementations, the media channel viewership controller 220 is to compute the respective aggregated viewership score for each of the media channel offerings by aggregating the media viewership signals across all the communications links of the intermediary network(s) 240. In other implementations, the media channel viewership controller 220 is to compute the respective aggregated viewership score for each of the media channel offerings by aggregating the media viewership signals in any other suitable manner, such as across passenger class (e.g., first- and business-class passengers are aggregated separately from economy-class passengers), across transport route (e.g., by origin-destination pairs), across fleet (e.g., by transport craft model, class, size, number of passengers, provider, etc.), across media channel interface version (e.g., versions of the media channel interface with different capabilities and/or listings can be aggregated separately), etc.

The media channel viewership controller 220 can compute the respective aggregated viewership scores with respect to one or more aggregation time windows. In some implementations, the aggregation time window is a moving window, such that the media viewership signals received at any particular time can be aggregated with media viewership signals from some period of time prior to the particular time. In other implementations, the aggregation time window is based on batch receipt of media viewership signals. For example, media viewership signals are received in batches (e.g., whenever a transport craft 110 reaches a destination), and each batch is aggregated with the other media viewership signals from that batch. In other implementations, the aggregation time window is a fixed, periodic window. For example, every night at a particular time, all media viewership signals received since the previous night at the particular time used in the aggregation.

Various embodiments can compute the respective aggregated viewership scores in different ways depending on the manner in which the media viewership signals are received. For example, in some embodiments, some or all of the media viewership signals are received from the on-board MD/I system 130. In such embodiments, the media viewership signals can be tagged with information to assist the media channel viewership controller 220 in making certain types of aggregation determinations. In some such embodiments, the media viewership signals can be pre-aggregated by the on-board MD/I system 130, such that some or all media viewership signals are received by the media channel viewership controller 220 already aggregated by transport craft 120 (e.g., and/or pre-aggregated by other factors, such as media channel offering, passenger type, cabin, etc.). In other such embodiments, the media viewership signals are tagged with information related to the transport craft 110, such as a transport craft identifier, a fleet identifier, an identifier of the carrier or network of the intermediary network(s) 240 that is presently serving the transport craft 110, a transport craft 110 type, one or more route identifiers (e.g., origin and destination identifiers), a total number of passengers, etc.

In other embodiments, some or all of the media viewership signals are received from the client devices 120 (e.g., without passing through the on-board MD/I system 130). In such embodiments, the media viewership signals can be tagged with information to assist the media channel viewership controller 220 in making certain types of aggregation determinations. In one implementation, the media viewership signals received from a particular client device 120 indicate geography and/or network identifiers usable to determine the transport craft 110 on which the client device 120 is located. In another implementation, the media viewership signals received from a particular client device 120 indicate information about the passenger associated with the client device 120 (e.g., demographic information, whether the passenger has particular loyalty program status, whether the passenger has a particular class of ticket, etc.). In another implementation, the media viewership signals received from a particular client device 120 indicate information about the client device 120 (e.g., screen size, operating system, interface type, etc.).

Embodiments of the media channel interface controller 230 can be communicatively coupled with the media channel viewership controller 220 and the transport craft interface 210 to detect a viewership update in response to monitoring for changes in the aggregated viewership scores computed by the media channel viewership controller 220. In some embodiments, the media channel interface controller 230 is to detect the viewership update by monitoring the aggregated viewership scores computed by the media channel viewership controller 220 to detect whether the aggregated viewership score for any of the media channel offerings has changed in excess of a predetermined threshold amount. In such embodiments, the media channel interface controller 230 can update the respective prominence parameters only when the aggregated viewership score for any media channel offering has changed in excess of the predetermined threshold amount. In other embodiments, the media channel interface controller 230 comprises a schedule memory (e.g., stored by the media channel interface controller 230, or at any other suitable location) having a predetermined interface update schedule stored thereon. In such embodiments, the media channel interface controller 230 can receive an update trigger in accordance with the interface update schedule (e.g., once per day, once per week, in accordance with a media channel offering update, etc.) and can update the respective prominence parameters in response to the update trigger. For example, detecting the viewership update can include detecting the update trigger. In other embodiments, the viewership update can be detected automatically as a response to any change in the aggregated viewership scores.

Responsive to detecting the viewership update, embodiments of the media channel interface controller 230 can update respective prominence parameters associated with each of at least a portion of the media channel offerings. In some implementations, updating the respective prominence parameters can cause an update in the relative order for display of the media channel offerings in the media channel interface. In other implementations, updating the respective prominence parameters can cause an update in any one or more of relative display sizes for display of the media channel offerings, coloration for display of the media channel offerings, framing for display of the media channel offerings, animations for display of the media channel offering, relative locations for display of the media channel offering with respect to display section groupings, and or any other suitable graphical parameters that impact relative graphical prominence of media channel offering listings on the media channel interface.

As described herein, the prominence parameters of each media channel offering can effectively correspond to a display prominence. In some embodiments, the display prominence of each media channel offering is directly mathematically correlated to the aggregated viewership score for that media channel offerings, such that the prominence parameters for a media channel offering can be determined directly from the aggregated viewership scores. For example, in some embodiments, the prominence parameters is a prominence score that is a function of the aggregated viewership score (e.g., equal to the aggregated viewership score, proportional to the aggregated viewership score, etc.). In other embodiments, the prominence parameters are determined from display prominence scores, which are computed from the aggregated viewership scores. In some embodiments, the prominence parameters take into consideration one or more additional factors such the device type of the client device, etc. In such a case, in some embodiments, media channel offerings having the same aggregated viewership scores may be displayed differently on different media channel interfaces (e.g., for different transport craft 110, for different passengers, etc.).

Figure 5:
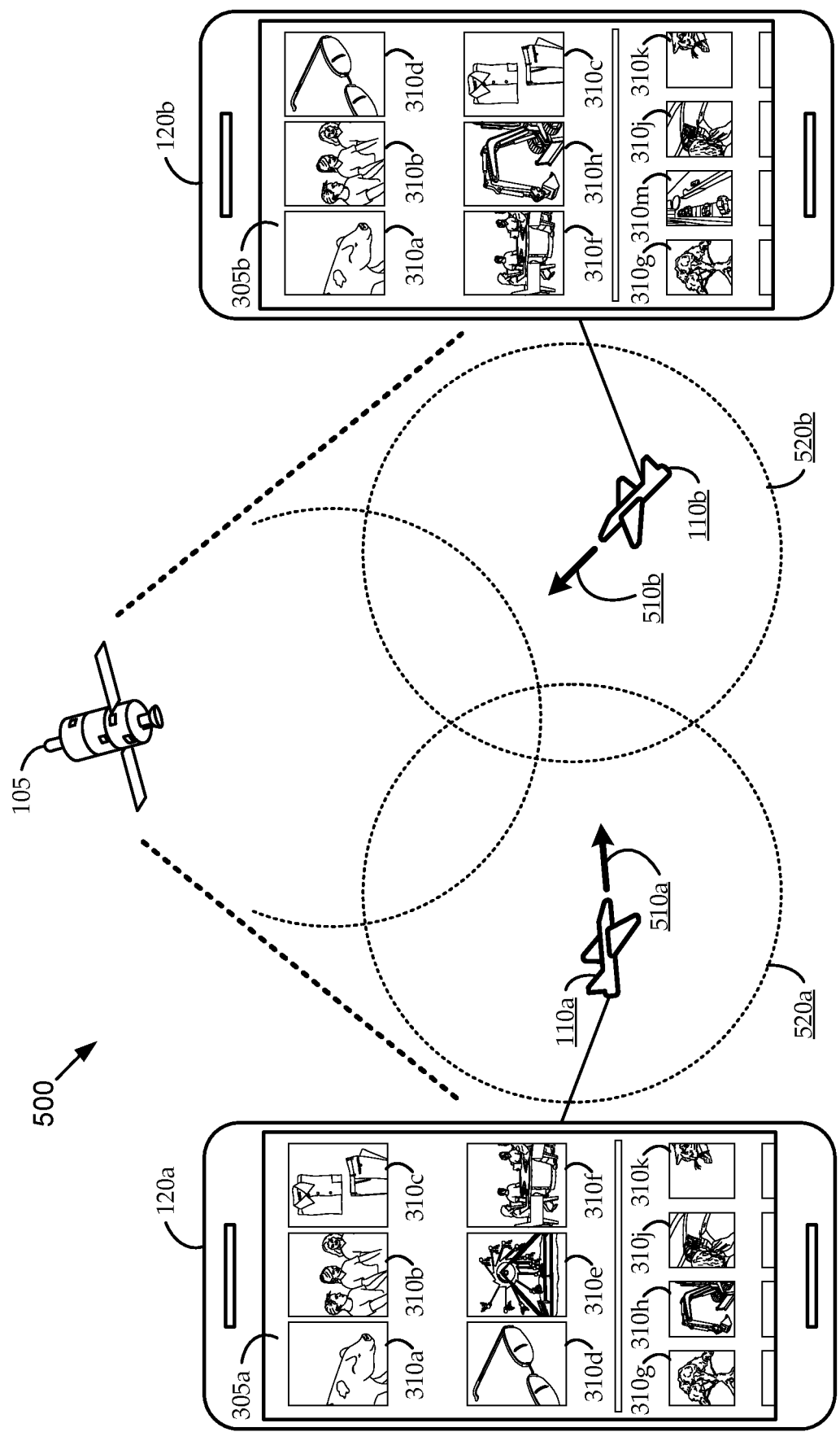
FIG. 5 shows an illustrative communications environment in which a satellite is servicing multiple transport craft via multiple carriers of a multi-carrier communications system.

For the sake of illustration, FIG. 5 shows an illustrative communications environment 500 in which a satellite 105 is servicing multiple transport craft 110 via multiple carriers 520 of a multi-carrier communications system. The satellite can provide communications services over a large geographic area using multiple spot beams, or the like, to implement the multiple carriers 520. The illustration represents a snapshot in time, during which a first transport craft 110a is traveling in a first direction (indicated by arrow 510a) and is being serviced by a first carrier 520a, and a second transport craft 110b is traveling in a second direction (indicated by arrow 510b) and is being serviced by a second carrier 520b. A representative first client device 120a of a passenger of the first transport craft 110a displays a first instance of a media channel interface 305a, and a representative second client device 120b of a passenger of the second transport craft 110b displays a second instance of the same media channel interface 305b. As illustrated, the two media channel interfaces 305 show representatives of many of the same media channel offerings, though in different orders. For example, as described herein, aggregating viewership scores differently for different carriers 520, and/or computing display priorities in different ways for different carriers 520, can result in different media channel offerings having different respective prominence parameters and correspondingly different display priorities in different carriers 520. As one illustrative case, the media channel offerings corresponding to offering interface controls 310a, 310b, and others may have very high aggregated viewership scores across the entire network, such that they are displayed at or near the top of the media channel interfaces 305 in both carriers 520. However, the media channel offering corresponding to offering interface control 310h, for example, has low enough prominence with respect to the first carrier 520a as to be below the fold, while the same media channel offering corresponding to the same offering interface control 310h has a high enough prominence with respect to the second carrier 520b as to be above the fold.

Returning to FIG. 2, the display prominence scores can be computed and/or otherwise derived from the aggregated viewership scores in any suitable manner. In some implementations, the display prominence represents a filtered prioritization; a high-prominence set of media channel offerings can be determined as those media channel offerings having highest aggregated viewership scores across the network (i.e., they are very popular among passengers across the network), and the display prominence scores can be computed to effectively filter the high-prominence set of media channel offerings by those meeting certain additional criteria. In one such implementation, the media channel offerings most prominently displayed on the media channel interface are those of the most popular media channel offerings that are also already being streamed to at least one transport craft 110 in a particular carrier of a multi-carrier intermediary network 240. In another such implementation, the media channel offerings most prominently displayed on the media channel interface are those of the most popular media channel offerings that are also part of a subset of media channel offerings available to a particular transport provider (e.g., different airline companies may provide different sets of media channel offerings to their passengers), a particular type of class of transport craft 110, a particular class of passenger, a particular version of the media channel interface, etc. In other implementations, the display prominence is computed as a weighted combination of different aggregated viewership scores. For example, the aggregated viewership scores themselves can be computed as a function of multiple aggregations (e.g., weighted or not) across multiple dimensions (e.g., across the network, then across each transport provider; or the like); and/or multiple aggregated viewership scores can be computed, and the display prominence can be computed as a weighted combination of those different aggregated viewership scores. In other implementations, the aggregated viewership scores and/or the display prominence are computed as a normalization of aggregated viewership scores. For example, some media channel interfaces (e.g., on some transport craft 110) may indicate twenty media channel offerings that can be selected by passengers, and other media channel interfaces may indicate two-hundred media channel offerings that can be selected by passengers; or a particular transit route may only provide for 35 minutes of on-board media consumption time, while another transit route may provide for 350 minutes of on-board media consumption time. In such contexts, factors other than passenger preference can appreciably impact passengers' media viewership. As such, prioritization accuracy can be increased in such cases by normalizing aggregated viewership scores and/or display priorities in a manner that seeks to normalize out such factors.

Descriptions herein generally assume that it is desirable to reduce intermediary network 240 resource consumption by encouraging passengers to select media channel offerings that will have less impact on such resource consumption. However, as also described herein, embodiments seek to maintain high passenger on-board media consumption satisfaction. As such, some embodiments can seek to balance intermediary network 240 resource consumption and passenger on-board media consumption by providing for dynamic re-prioritization of media channel offerings for different conditions. In some such embodiments, resources of the intermediary networks 240 can be monitored to determine how much present capacity exists for streaming media channel offerings to transport craft 110. When a lot of excess capacity is available, such embodiments can shift the balance in favor of high passenger on-board media consumption satisfaction at the expense of consuming more intermediary network 240 resources; and when limited capacity is available, such embodiments can shift the balance in favor of low consumption of intermediary network 240 resources at the possible expense of some passenger on-board media consumption satisfaction. For example, as the intermediary network 240 resource capacity becomes more limited, fewer streaming media channel offerings may be prominently listed in the media channel interface, and more pre-positioned media channel offerings may be listed with higher prominence.

Having updated respective prominence parameters associated with some or all of the media channel offerings, embodiments of the media channel interface controller 230 can communicate interface control signals to the client devices 120 (e.g., directly and/or via on-board MD/I systems 130) via the transport craft interface 210. The interface control signals are communicated in a manner, so as to direct display, via the client devices 120 on board the transport craft 110, of the media channel interface. The interface control signals can cause the manner in which the media channel offerings are displayed on the media channel interface to be graphically updated to reflect the updated respective prominence parameters. In some implementations, the same interface control signals are communicated by the media channel interface controller 230 to all transport craft 110 and/or client devices 120. In other implementations, a unique set of interface control signals is communicated to each transport craft 110 and/or client device 120. In other implementations, different interface control signals are communicated to different categories of transport craft 120 and/or to different categories of client devices 120. For example, different computations can be used for aggregated viewership scores in accordance with different types of groupings (e.g., route, transport craft 110 type, passenger type, client device 120 type, etc.), those groupings can be used to compute corresponding interface control signals based on relevant changes in prominence for those groupings, and those corresponding interface control signals can be communicated to those of the transport craft 110 and/or client devices 120 that fall within those groupings. As such, across the network, different media channel offerings may be graphically represented in different ways (i.e., with different graphical prominence) on different media channel interfaces, as displayed on different transport craft 110, by different client devices 120, and/or at different times.

In some embodiments, the off-board MD/I system 140 further includes a transport craft tracker 215 to monitor transport status of the transport craft 110. In some implementations, the transport craft tracker 215 tracks whether any particular transport craft 110 is parked or in transit. In other implementations, the transport craft tracker 215 can monitor one or more other transport status-related characteristics of some or all of the transport craft 110, such as present speed, present altitude, present location, etc. In such embodiments, the media channel interface controller 230 can be in communication with the transport craft tracker 215 to receive a present transport status for at least one transport craft of the plurality of transport craft indicating whether any particular transport craft 110 is presently in transport, and the media channel interface controller 230 can communicate the interface control signals to the particular transport craft 110 only when the particular transport craft 110 is presently not in transport (e.g., only when the transport craft 110 is parked, etc.).

As described above, each transport craft 110 can include an on-board MD/I system 130 to help enable features of embodiments described herein, including features described above with reference to components of the off-board MD/I system 140. Each on-board MD/I system 130 can include a provider network interface 260, an on-board network interface 270, a media channel request controller 280, and an on-board media store (OBMS) 285. Embodiments of the provider network interface 260 can communicate with the off-board network 155 (e.g., with components of the off-board MD/I system 140) via one or more intermediary networks 240 (e.g., including one or more long-range wireless communication links). For example, signals communicated between the intermediary networks 240 and the transport craft 110, and/or between the intermediary networks 240 and the client devices 120 on board the transport craft 110, are transmitted and received via the provider network interface 260.

Embodiments of the on-board network interface 270 can enable communications (e.g., via an on-board communications network) between components of the on-board MD/I system 130 and the client devices 120 disposed on the transport craft 110. In some implementations, some or all signals between client devices 120 and the intermediary networks 240 are communicated directly to and from the client devices 120 (e.g., antennas and related components of the client devices 120 communicate directly with the intermediary networks 240). In other implementations, some or all signals between client devices 120 and the intermediary networks 240 pass through the provider network interface 260 and the on-board network interface 270.

Embodiments of the media channel request controller 280 can communicate with the client devices 120 (e.g., via the on-board network interface 270) to direct display of the adaptive on-board media channel interface in accordance with interface control signals received from the off-board network 155 via the provider network interface 260. As described above, the adaptive on-board media channel interface graphically indicates the media channel offerings in accordance with respective prominence parameters indicated by the interface control signals. Also as described above, the interface control signals are generated by the off-board network 155 (e.g., the off-board MD/I system 140) in accordance with aggregating media viewership signals from at least the on-board MD/I system 130 of one transport craft 110 (and likely multiple other on-board MD/I systems 130 of multiple other transport craft 110) to compute respective aggregated viewership scores for the media channel offerings, such that the respective prominence parameters for the media channel offerings are automatically updated to maintain correspondence to the respective aggregated viewership scores.

To that end, embodiments of the media channel request controller 280 can also transmit the media viewership signals to the off-board network 155 via the provider network interface 260, such that the media viewership signals indicate viewership of the media channel offerings by the client devices; and embodiments of the media channel request controller 280 can receive the interface control signals from the off-board network 155 via the provider network interface 260 in accordance with the media viewership signals. In some embodiments, the media channel request controller 280 on a particular transport craft 110 can compute an aggregated viewership by aggregating the viewership of the media channel offerings by the client devices 120 on board that particular transport craft 110 over an aggregation time window. In such embodiments, the media channel request controller 280 can communicate with the off-board network 155 via the provider network interface 260 to transmit the media viewership signals indicating the aggregated viewership. In some embodiments, the media channel request controller 280 can communicate with the off-board network 155 via the provider network interface 260 further to transmit an interface update request signal indicating a request for an update to the adaptive on-board media channel interface. In such embodiments, the media channel request controller 280 can receive the interface control signals from the off-board network 155 via the intermediary networks 240 in response to the interface update request signal. The media channel request controller 280 can transmit such an interface update request signal at any suitable time. In various implementations, the interface update request signal can be transmitted responsive to detecting one or more of a parked condition for the transport craft 110, a periodic scheduling event, elapsing of a predetermined amount of time, transitioning from between carriers of a multi-carrier intermediary network 240, etc.

As described above, some embodiments can support only streamed media channel offerings, and other embodiments can support a combination of streamed and pre-positioned media channel offerings. Some embodiments of the media channel request controller 280 can include, or can be in communication with, an on-board media channel stream controller 282 to receive, from the off-board network 155 via the intermediary networks 240, at least a portion of the media channel offerings as a media streams. Embodiments of the on-board MD/I system 130 can also include the OBMS 285, which can have multiple pre-positioned media channel offerings stored thereon. For example, a first portion of the media channel offerings that are selectable for viewing via the adaptive on-board media channel interface for the transport craft 110 can include at least some of the media channel offerings received as media streams, and a second portion of the media channel offerings that are selectable for viewing via the adaptive on-board media channel interface for the transport craft 110 can include at least some of the media channel offerings stored in the OBMS as pre-positioned media channel offerings.

Figure 6:
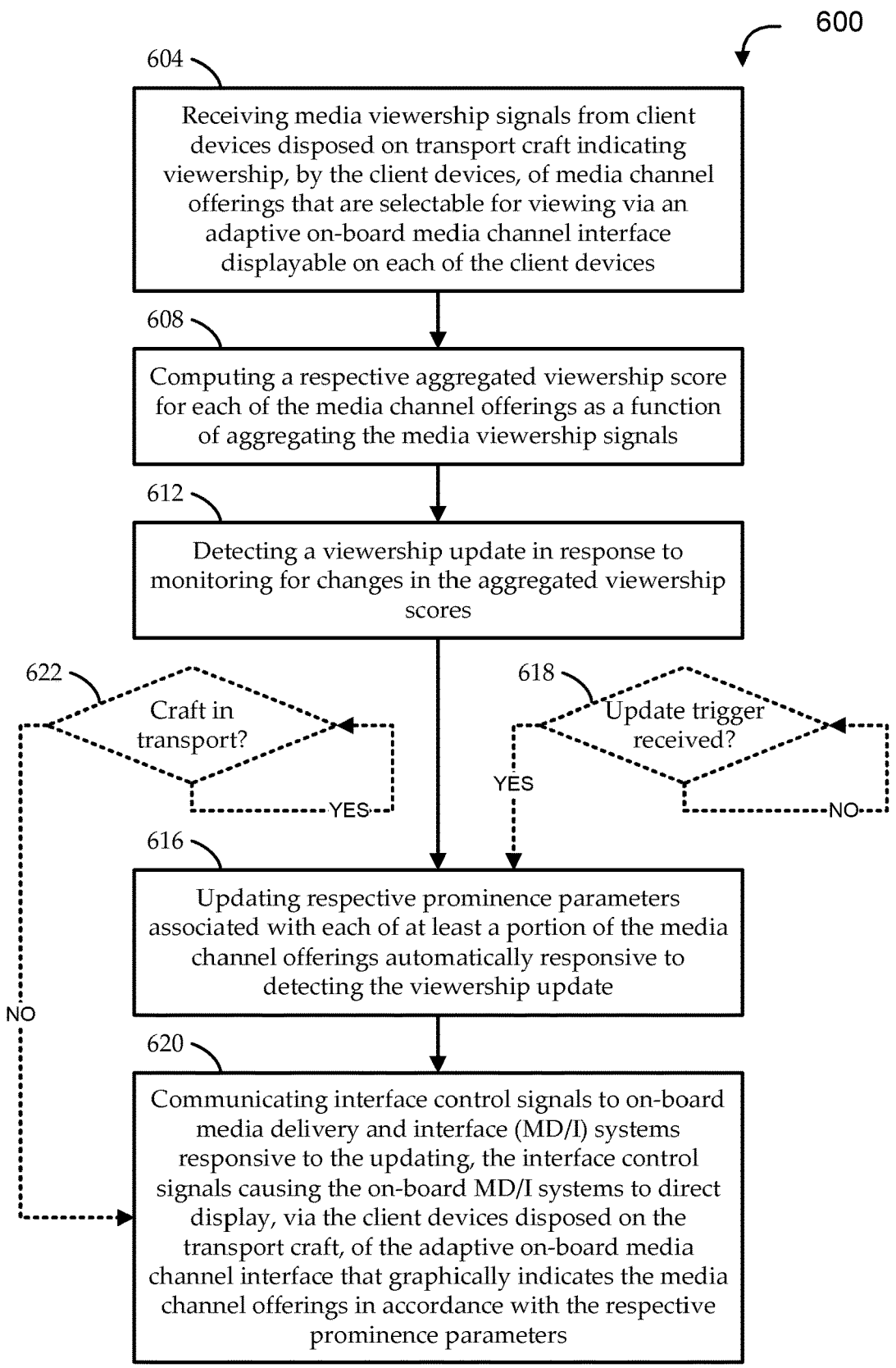
FIG. 6 shows a flow diagram of an illustrative method for automatically adapting an on-board media channel interface of transport craft in a communications system.

FIG. 6 shows a flow diagram of an illustrative method 600 for automatically adapting an on-board media channel interface of transport craft in a communications system. Embodiments of the method 600 begin at stage 604 by receiving media viewership signals from multiple client devices disposed on multiple transport craft. The media viewership signals indicate viewership, by the client devices, of multiple media channel offerings that are selectable for viewing via an adaptive on-board media channel interface displayable on each of the client devices. For example, each of some or all passengers on-board a transport craft can view media channel offerings via client devices. The client devices can also each display on-board media channel interfaces that present the passengers with indications of which media channel offerings are available for viewing, and the passengers can select media channel offerings for viewing through the on-board media channel interfaces. Data regarding passengers selection and viewing of the media channel offerings by the passengers can be converted by on-board media delivery and interface (MD/I) systems of the transport craft to the media viewership signals. The media viewership signals can then be received by one or more off-board MD/I systems in an off-board network.

At stage 608, embodiments can compute a respective aggregated viewership score for each of the media channel offerings as a function of aggregating the media viewership signals. The computation at stage 608 can be performed in various ways, as described herein. For example, aggregated viewership scores can be computed by aggregating the media viewership signals across those of the client devices disposed on each transport craft of the multiple transport craft over an aggregation time window, by aggregating the media viewership signals across those of the transport craft serviced by each carrier of a multi-carrier intermediary network over the aggregation time window, by aggregating the media viewership signals over the aggregation time window across a one or more communication links of the intermediary networks that have been determined to experience congestion exceeding a predetermined congestion threshold during at least a portion of the aggregation time window, by aggregating the media viewership signals across all of the intermediary networks (e.g., all communication links, all carriers, etc.) over the aggregation time window, etc.

At stage 612, embodiments can detect a viewership update in response to monitoring for changes in the aggregated viewership scores. At stage 616, embodiments can update respective prominence parameters associated with each of at least a portion of the media channel offerings automatically responsive to detecting the viewership update. In one implementation, updating the respective prominence parameters can include (or can cause) updating the relative order for display of the media channel offering of one or more of the media channel offerings. In another implementation, updating the respective prominence parameters can include (or can cause) updating the relative location for display of the media channel offering with respect to multiple display section groupings (e.g., above or below one or more folds, in one or more tabs or sub-menus, etc.). In other implementations, updating the respective prominence parameters can include (or can cause) updating of any other suitable characteristics of one or more of the media channel offerings having an impact on the relative graphical prominence of the one or more of the media channel offerings as represented by the on-board media channel interface (e.g., coloration, size, framing, animation, etc.).

In some embodiments, detecting the viewership update at stage 612 involves monitoring the aggregated viewership scores to detect whether the aggregated viewership score for any one or more of the media channel offerings has changed in excess of a predetermined threshold amount. In such embodiments, the updating at stage 616 can be performed only when the aggregated viewership score for any media channel offering of the plurality of media channel offerings has changed in excess of the predetermined threshold amount. In some embodiments, at stage 618, the method 600 can receive an update trigger indicating occurrence of a predetermined interface update schedule event (e.g., passage of a predetermined amount of time, detecting of a parked condition of the transport craft, etc.). In such embodiments, the updating at stage 616 can be performed in response to the update trigger.

At stage 620, embodiments can communicate interface control signals to one or more on-board media delivery and interface (MD/I) systems responsive to the updating, the interface control signals causing the on-board MD/I systems to direct display, via the client devices disposed on the transport craft, of the adaptive on-board media channel interface that graphically indicates the media channel offerings in accordance with the respective prominence parameters. In some embodiments, even though the prominence parameters may be updated at stage 616, the interface control signals are only communicated to the transport craft 110 (and/or to the client devices 120) under particular conditions. For example, at stage 622, the method 600 can monitor a present transport status of at least one of the transport craft to determine whether the at least one transport craft is presently in transport (e.g., is not parked, is traversing a scheduled transport route, etc.), and the communicating at stage 620 is to the at least one transport craft only when the at least one transport craft is presently not in transport.

Figure 7:
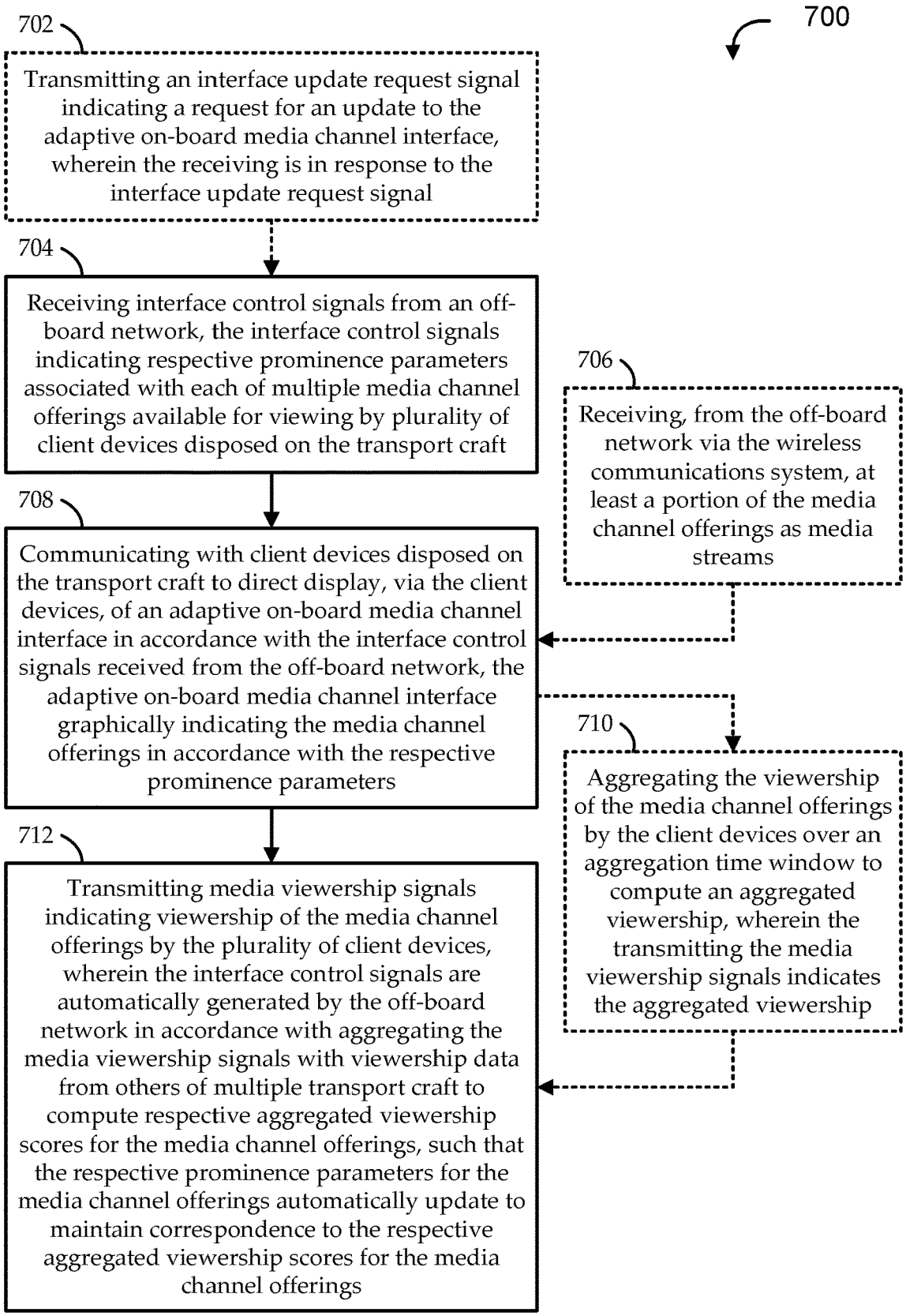
FIG. 7 shows a flow diagram of an illustrative method for automatically adapting an on-board media channel interface of a transport craft operating in a communications system.

FIG. 7 shows a flow diagram of an illustrative method 700 for automatically adapting an on-board media channel interface of a transport craft operating in a communications system. Embodiments of the method 700 begin at stage 704 by receiving interface control signals from an off-board network. The interface control signals can indicate respective prominence parameters associated with each of multiple media channel offerings available for viewing by client devices disposed on the transport craft. For example, the interface control signals are received by an on-board media delivery and interface (MD/I) system of the transport craft from an off-board MD/I systems of an off-board network.

In some embodiments, the method 700 begins at 702 by transmitting an interface update request signal indicating a request for an update to the adaptive on-board media channel interface. In such embodiments, the receiving at stage 704 can be in response to the interface update request signal. For example, at various times, the on-board MD/I system of the transport craft requests an update to the adaptive on-board media channel interface. Such times can be, for example, responsive to certain transport craft conditions (e.g., whenever the transport craft is parked, whenever the transport craft receives new pre-positioned content, etc.), at predetermined periodic intervals (e.g., once per day, once per week, etc.), in accordance with a predetermined schedule, etc.

At stage 708, embodiments can communicate with some or all of the client devices disposed on the transport craft to direct display, via the client devices, of the adaptive on-board media channel interface in accordance with the interface control signals received from the off-board network. As described herein, the adaptive on-board media channel interface can graphically indicate the media channel offerings in accordance with the respective prominence parameters. For example, indications (e.g., titles, icons, video previews, etc.) of the various media channel offerings can be shown on the on-board media channel interface using a certain order, using certain navigation hierarchies (e.g., menus, tabs, etc.), using different relative graphical elements (e.g., size, color, framing, etc.), and/or using any other suitable graphical indications of relative prominence.

Some embodiments, at stage 706, receive at least a portion of the media channel offerings as media streams from the off-board network via one or more intermediary network(s). In some implementations, each of the media channel offerings corresponds to streamed content channels, which include content items or groups of content items that are being streamed, or that can be streamed, to the transport craft via links of the intermediary network(s) during transit. For example, the streamed content channels can include Internet protocol television (IPTV) streams, or the like. In other implementations, some of the media channel offerings correspond to streamed content channels, and others of the media channel offerings correspond to content items pre-positioned in on-board storage of the transport craft. As described herein, embodiments of the on-board media channel interface can be adapted to graphically represent some or all of the media channel offerings in a manner that accounts for whether particular media channel offerings are streamed or pre-positioned.

At stage 712, embodiments can transmit media viewership signals indicating viewership of the media channel offerings by the client devices. As described herein, the interface control signals can be automatically generated by the off-board network in accordance with aggregating the media viewership signals with viewership data from other transport craft to compute respective aggregated viewership scores for the media channel offerings. In such a way, the respective prominence parameters for the media channel offerings can be automatically updated to maintain correspondence to the respective aggregated viewership scores for the plurality of media channel offerings. In some embodiments, each transport craft can participate in the aggregation of its media viewership signals by, at stage 710, aggregating the viewership of the media channel offerings by the client devices over an aggregation time window to compute an aggregated viewership. For example, the on-board MD/I system of a particular transport craft can aggregate the viewership of media channel offerings by the client devices of passengers on-board that particular transport craft during the aggregation time window (e.g., during a particular transit route, over a day, etc.). In such embodiments, transmitting the media viewership signals at stage 712 can indicate the aggregated viewership (e.g., the media viewership signals received by the off-bard MD/I system are at least partially pre-aggregated).

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A media delivery and interface (MD/I) system comprising:
   a transport craft interface, disposed in an off-board network of a communications system, to communicate with a plurality of client devices disposed on a plurality of transport craft;
   a media channel viewership controller, disposed in the off-board network and communicatively coupled with the transport craft interface, to:
   receive media viewership signals indicating viewership by the plurality of client devices of a plurality of media channel offerings that are selectable for viewing via an adaptive on-board media channel interface displayable on each of the client devices; and
   compute a respective aggregated viewership score for each of the plurality of media channel offerings as a function of aggregating the media viewership signals; and
   a media channel interface controller, disposed in the off-board network and communicatively coupled with the media channel viewership controller and the transport craft interface, to:
   detect a viewership update in response to monitoring for changes in the aggregated viewership scores computed by the media channel viewership controller;
   update respective prominence parameters associated with one or more of the plurality of media channel offerings responsive to detecting the viewership update, wherein the prominence parameters comprise quantitative values that impact relative graphical prominence of each media channel offering relative to some or all of the plurality of media channel offerings;
   communicate interface control signals to the plurality of client devices via the transport craft interface, the interface control signals to direct display, via the plurality of client devices disposed on the plurality of transport craft, of the adaptive on-board media channel interface to graphically indicate the plurality of media channel offerings in accordance with the respective prominence parameters; and
   wherein the interface control signals direct display of a default interface display of the adaptive on-board media channel interface comprising a subset of media channel offerings having highest prominence parameters, and wherein other media channel offerings having relatively lower prominence parameters require an additional interaction with the adaptive on-board media channel interface to display the other media channel offerings.

2. The media delivery and interface system of claim 1, wherein, for each respective transport craft of at least one of the plurality of transport craft:
   the respective transport craft has an on-board MD/I system disposed thereon, the on-board MD/I system in communication with those of the plurality of client devices disposed on the respective transport craft; and
   the transport craft interface is to communicate with those of the plurality of client devices disposed on the respective transport craft via the on-board MD/I system; and
   the media channel interface controller is to communicate the interface control signals to the on-board MD/I system via the transport craft interface, causing the on-board MD/I system to direct display, via those of the plurality of client devices disposed on the transport craft, of the adaptive on-board media channel interface to graphically indicate the plurality of media channel offerings in accordance with the respective prominence parameters.

3. The media delivery and interface system of claim 2, wherein:
   a portion of the media viewership signals corresponds to those of the plurality of client devices disposed on the respective transport craft;
   the media channel viewership controller is to receive the portion of the media viewership signals from the on-board MD/I system as a pre-aggregated indication of viewership of the plurality of media channel offerings by those of the plurality of client devices disposed on the respective transport craft.

4. The media delivery and interface system of claim 1, wherein the media channel interface controller is to update the respective prominence parameters by updating, for each media channel offering of at least one of the plurality of media channel offerings, a relative order for display of the media channel offering based on the quantitative values of the respective prominence parameters.

5. The media delivery and interface system of claim 1, wherein the media channel interface controller is to update the respective prominence parameters by updating, for each media channel offering of at least one of the plurality of media channel offerings, at least one of:
   a relative display size for display of the media channel offering;
   a background display color for display of the media channel offering;
   a frame for display of the media channel offering;
   an animation for display of the media channel offering; or
   a relative location for display of the media channel offering with respect to a plurality of display section groupings.

6. The media delivery and interface system of claim 1, wherein the plurality of media channel offerings that are selectable for viewing via the adaptive on-board media channel interface comprises a plurality of streamed media channel offerings communicated to the plurality of transport craft from an off-board network via one or more intermediary networks.

7. The media delivery and interface system of claim 6, wherein:
each respective transport craft of the plurality of transport craft has an on-board media store disposed thereon, the on-board media store having, stored thereon, a plurality of pre-positioned media channel offerings deliverable to those of the client devices disposed on the transport craft via an on-board communications network of the respective transport craft; and
the plurality of media channel offerings that are selectable for viewing via the adaptive on-board media channel interface for the respective transport craft further comprises one or more of the plurality of pre-positioned media channel offerings.

8. The media delivery and interface system of claim 7, wherein:
a first portion of the plurality of streamed media channel offerings is identified as higher-prominence streamed media channel offerings in accordance with the respective prominence parameters of the first portion;
a second portion of the plurality of streamed media channel offerings is identified as lower-prominence streamed media channel offerings in accordance with the respective prominence parameters of the second portion; and
the interface control signals direct display of the adaptive on-board media channel interface in such a way that includes a high-prominence listing graphically indicating the higher-prominence streamed media channel offerings, a mid-prominence listing graphically indicating at least a portion of the pre-positioned media channel offerings, and a low-prominence listing graphically indicating at least a portion of the lower-prominence streamed media channel offerings.

9. The media delivery and interface system of claim 6, wherein:
a first portion of the plurality of streamed media channel offerings is identified as higher-prominence streamed media channel offerings in accordance with the respective prominence parameters of the first portion;
a second portion of the plurality of streamed media channel offerings is identified as lower-prominence streamed media channel offerings in accordance with the respective prominence parameters of the second portion; and
the interface control signals direct display of the adaptive on-board media channel interface in such a way that includes the higher-prominence streamed media channel offerings and does not include the lower-prominence streamed media channel offerings.

10. The media delivery and interface system of claim 1, wherein:
the media channel interface controller is to detect the viewership update by monitoring the aggregated viewership scores computed by the media channel viewership controller to detect whether the aggregated viewership score for any media channel offering of the plurality of media channel offerings has changed in excess of a predetermined threshold amount; and
the media channel interface controller is to update the respective prominence parameters only when the aggregated viewership score for any media channel offering of the plurality of media channel offerings has changed in excess of the predetermined threshold amount.

11. The media delivery and interface system of claim 1, wherein:
the media channel interface controller comprises a schedule memory having a predetermined interface update schedule stored thereon; and
the media channel interface controller is further to receive an update trigger in accordance with the interface update schedule, and to update the respective prominence parameters in response to the update trigger.

12. The media delivery and interface system of claim 1, further comprising:
a transport craft tracker disposed in the off-board network to monitor transport status of the plurality of transport craft,
wherein the media channel interface controller is in communication with the transport craft tracker to receive a present transport status for at least one transport craft of the plurality of transport craft indicating whether the at least one transport craft is presently in transport, and
wherein the media channel interface controller is to communicate the interface control signals to the at least one transport craft only when the at least one transport craft is presently not in transport.

13. The media delivery and interface system of claim 1, wherein the media channel viewership controller is further to:
compute the respective aggregated viewership score for each of the plurality of media channel offerings per transport craft as a function of aggregating, for the respective transport craft, the media viewership signals corresponding to a respective set of client devices disposed on the respective transport craft.

14. The media delivery and interface system of claim 1, wherein the media channel viewership controller is to compute the respective aggregated viewership score for each of the plurality of media channel offerings as a function of at least one of:
aggregating the media viewership signals across those of the plurality of client devices disposed on each transport craft of the plurality of transport craft over an aggregation time window;
aggregating the media viewership signals per carrier across those of the plurality of transport craft serviced by each carrier of a plurality of carriers of the communications system over the aggregation time window;
aggregating the media viewership signals, over the aggregation time window, across a subset of communication links of the communications system determined to experience congestion exceeding a predetermined congestion threshold during at least a portion of the aggregation time window; or
aggregating the media viewership signals across all of the communications system over the aggregation time window.

15. The media delivery and interface system of claim 1, wherein the communications system comprises a satellite communications network having a plurality of spot beams.

16. A method for automatically adapting an on-board media channel interface of transport craft in a communications system, the method comprising:
receiving media viewership signals indicating viewership by a plurality of client devices disposed on a plurality of transport craft of a plurality of media channel offerings that are selectable for viewing via an adaptive on-board media channel interface displayable on each of the client devices;

computing a respective aggregated viewership score for each of the plurality of media channel offerings as a function of aggregating the media viewership signals;

detecting a viewership update in response to monitoring for changes in the aggregated viewership scores;

updating respective prominence parameters associated with one or more of the plurality of media channel offerings automatically responsive to detecting the viewership update, wherein the prominence parameters comprise quantitative values that impact relative graphical prominence of each media channel offering relative to some or all of the plurality of media channel offerings;

communicating interface control signals to the plurality of transport craft responsive to the updating, the interface control signals to direct display, via the plurality of client devices disposed on the transport craft, of the adaptive on-board media channel interface that graphically indicates the plurality of media channel offerings in accordance with the respective prominence parameters; and wherein the interface control signals direct display of a default interface display of the adaptive on-board media channel interface comprising a subset of media channel offerings having highest prominence parameters, and wherein other media channel offerings having relatively lower prominence parameters require an additional interaction with the adaptive on-board media channel interface to display the other media channel offerings.

17. The method of claim 16, wherein:

for each respective transport craft of at least one of the plurality of transport craft, the transport craft has an on-board MD/I system disposed thereon, the on-board MD/I system in communication with those of the plurality of transport craft disposed on the respective transport craft;

the communicating the interface control signals comprises communicating the interface control signals to the on-board MD/I system on the respective transport craft, the interface control signals cause the on-board MD/I system to direct display, via the plurality of client devices, of the adaptive on-board media channel interface.

18. The method of claim 17, wherein:

a portion of the media viewership signals corresponds to those of the plurality of client devices disposed on the respective transport craft; and the receiving comprises receiving the portion of the media viewership signals from the on-board MD/I system as a pre-aggregated indication of viewership of the plurality of media channel offerings by those of the plurality of client devices disposed on the respective transport craft.

19. The method of claim 16, wherein the updating comprises updating, for each media channel offering of at least one of the plurality of media channel offerings, a relative order for display of the media channel offering based on the quantitative values of the respective prominence parameters.

20. The method of claim 16, wherein the updating comprises updating, for each media channel offering of at least one of the plurality of media channel offerings, at least one of:

a relative display size for display of the media channel offering;

a background display color for display of the media channel offering;

a frame for display of the media channel offering;

an animation for display of the media channel offering; or a relative location for display of the media channel offering with respect to a plurality of display section groupings.

21. The method of claim 16, wherein the plurality of media channel offerings that are selectable for viewing via the adaptive on-board media channel interface comprises a plurality of streamed media channel offerings communicated to the plurality of transport craft from an off-board network via one or more intermediary networks.

22. The method of claim 21, wherein:

each respective transport craft of the plurality of transport craft has an on-board media store disposed thereon, the on-board media store having, stored thereon, a plurality of pre-positioned media channel offerings deliverable to those of the client devices disposed on the transport craft via an on-board communications network of the respective transport craft; and the plurality of media channel offerings that are selectable for viewing via the adaptive on-board media channel interface for the respective transport craft further comprises one or more of the plurality of pre-positioned media channel offerings.

23. The method of claim 22, wherein:

a first portion of the plurality of streamed media channel offerings is identified as higher-prominence streamed media channel offerings in accordance with the respective prominence parameters of the first portion;

a second portion of the plurality of streamed media channel offerings is identified as lower-prominence streamed media channel offerings in accordance with the respective prominence parameters of the second portion; and the interface control signals direct display of the adaptive on-board media channel interface in such a way that includes a high-prominence listing graphically indicating the higher-prominence streamed media channel offerings, a mid-prominence listing graphically indicating at least a portion of the pre-positioned media channel offerings, and a low-prominence listing graphically indicating at least a portion of the lower-prominence streamed media channel offerings.

24. The method of claim 21, wherein:

a first portion of the plurality of streamed media channel offerings is identified as higher-prominence streamed media channel offerings in accordance with the respective prominence parameters of the first portion;

a second portion of the plurality of streamed media channel offerings is identified as lower-prominence streamed media channel offerings in accordance with the respective prominence parameters of the second portion; and the interface control signals direct display of the adaptive on-board media channel interface in such a way that includes the higher-prominence streamed media channel offerings and does not include the lower-prominence streamed media channel offerings.

25. The method of claim 16, wherein:

the detecting comprises monitoring the aggregated viewership scores to detect whether the aggregated viewership score for any media channel offering of the plurality of media channel offerings has changed in excess of a predetermined threshold amount; and the updating is performed only when the aggregated viewership score for any media channel offering of the plurality of media channel offerings has changed in excess of the predetermined threshold amount.

26. The method of claim 16, further comprising:

receiving an update trigger indicating occurrence of a predetermined interface update schedule event, wherein the updating is performed in response to the update trigger.

27. The method of claim 16, further comprising:

monitoring a present transport status of at least one transport craft of the plurality of transport craft to determine whether the at least one transport craft is presently in transport, wherein the communicating is to the at least one transport craft only when the at least one transport craft is presently not in transport.

28. The method of claim 16, wherein the computing the respective aggregated viewership score for each of the plurality of media channel offerings is per transport craft as a function of aggregating, for the respective transport craft, the media viewership signals corresponding to a respective set of client devices disposed on the respective transport craft.

29. The method of claim 16, wherein the computing the respective aggregated viewership score for each of the plurality of media channel offerings as a function of at least one of:

aggregating the media viewership signals across those of the plurality of client devices disposed on each transport craft of the plurality of transport craft over an aggregation time window;

aggregating the media viewership signals per carrier across those of the plurality of transport craft serviced by each carrier of a plurality of carriers of the communications system over the aggregation time window;

aggregating the media viewership signals, over the aggregation time window, across a subset of communication links of the communications system determined to experience congestion exceeding a predetermined congestion threshold during at least a portion of the aggregation time window; or aggregating the media viewership signals across all of the communications system over the aggregation time window.

30. The method of claim 16, wherein the communications system comprises a satellite communications network having a plurality of spot beams.

* * * * *